(12) United States Patent
Deng et al.

(10) Patent No.: US 6,915,416 B2
(45) Date of Patent: Jul. 5, 2005

(54) APPARATUS AND METHOD FOR MICROCONTROLLER DEBUGGING

(75) Inventors: Brian Tse Deng, Richardson, TX (US); Jian Yu, Plano, TX (US); Fengchun Duan, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 712 days.

(21) Appl. No.: 09/752,567

(22) Filed: Dec. 28, 2000

(65) Prior Publication Data

US 2003/0037225 A1 Feb. 20, 2003

(51) Int. Cl.$^7$ .............................................. G06F 13/24
(52) U.S. Cl. ...................................................... 712/227
(58) Field of Search ........................................ 712/227

(56) References Cited

U.S. PATENT DOCUMENTS

| | | | | |
|---|---|---|---|---|
| 4,747,045 A | * | 5/1988 | Harigai et al. | 712/207 |
| 5,455,936 A | * | 10/1995 | Maemura | 714/35 |
| 5,717,851 A | * | 2/1998 | Yishay et al. | 714/25 |
| 5,903,718 A | * | 5/1999 | Marik | 714/38 |
| 5,983,017 A | * | 11/1999 | Kemp et al. | 717/129 |
| 6,035,422 A | * | 3/2000 | Hohl et al. | 714/35 |
| 6,038,661 A | * | 3/2000 | Yoshioka et al. | 712/244 |
| 6,336,178 B1 | * | 1/2002 | Favor | 712/23 |
| 6,343,358 B1 | * | 1/2002 | Jaggar et al. | 712/227 |
| 6,615,370 B1 | * | 9/2003 | Edwards et al. | 714/45 |
| 6,681,280 B1 | * | 1/2004 | Miyake et al. | 710/261 |

OTHER PUBLICATIONS

"An Introduction to the Intel MCS–51 Single–Chip Microcomputer Family", John Wharton, Intel Corporation, May 1980.

* cited by examiner

*Primary Examiner*—Eric Coleman
(74) *Attorney, Agent, or Firm*—J. Dennis Moore; W. James Brady, III; Frederick J. Telecky, Jr.

(57) ABSTRACT

Apparatus and method for microcontroller debugging. A preferred embodiment microcontroller integrated circuit comprises debug circuitry on the integrated circuit. The debug circuitry is capable of breaking normal instruction execution based on an address breakpoint, a stack pointer breakpoint, or a single step breakpoint. Upon detection of a valid breakpoint, the debug circuitry substitutes a jump to a debug program instruction in place of the next normal application program instruction. The debug program then may provide microcontroller status to a developer, allowing the developer to debug the application program. Upon completion of the debug program, control of the microcontroller is returned to the application program at the point of interruption.

17 Claims, 17 Drawing Sheets

FIG. 12

| DESCRIPTION | LABEL | ADDRESS |
|---|---|---|
| PORT-0 | P0 | 80 |
| STACK POINTER | SP | 81 |
| DATA POINTER LB | DPL | 82 |
| DATA POINTER HB | DPH | 83 |
| POWER CONTROL REG | PCON | 87 |
| TIMER/COUNTER CONTROL | TCON | 88 |
| TIMER/COUNTER MODE | TMOD | 89 |
| TIMER/COUNTER-0 LB | TL0 | 8A |
| TIMER/COUNTER-1 LB | TL1 | 8B |
| TIMER/COUNTER-0 HB | TH0 | 8C |
| TIMER/COUNTER-1 HB | TH1 | 8D |
| PORT-1 | P1 | 90 |
| SERIAL CONTROL REGISTER | SCOM | 98 |
| SERIAL DATA BUFFER | SBUF | 99 |
| PORT-2 | P2 | A0 |
| INTERRUPT ENABLE REGISTER | IE | A8 |
| PORT-3 | P3 | B0 |
| INTERRUPT PRIORITY REGISTER | IP | B8 |
| BPSTA: BREAK POINT STATUS REGISTER | BPSTA | BD |
| BPL1: BREAK POINT REGISTER-1 (LB) | BPL1 | BE |
| BPH1: BREAK POINT REGISTER-1 (HB) | PBH1 | BF |
| BNK1: BREAK POINT BANK REGISTER-1 | BNK1 | C0 |
| BPL2: BREAK POINT REGISTER-2 (LB) | BPL2 | C1 |
| BPH2: BREAK POINT REGISTER-2 (HB) | PBH2 | C2 |
| BNK2: BREAK POINT BANK REGISTER-2 | BNK2 | C3 |
| BPL3: BREAK POINT REGISTER-3 (LB) | BPL3 | C4 |
| BPH3: BREAK POINT REGISTER-3 (HB) | PBH3 | C5 |
| BNK3: BREAK POINT BANK REGISTER-3 | BNK3 | C6 |
| BPL4: BREAK POINT REGISTER-4 (LB) | BPL4 | C7 |
| BPH4: BREAK POINT REGISTER-4 (HB) | PBH4 | C8 |
| BNK4: BREAK POINT BANK REGISTER-4 | BNK4 | C9 |
| JTML: JUMP TO MONITOR ADDRESS REGISTER (LB) | JTML | CA |
| JTMH: JUMP TO MONITOR ADDRESS REGISTER (HB) | JTMH | CB |
| RESERVED | | CC |
| RESERVED | | CD |
| SBK: STACK BREAK POINT REGISTER | SBK | CE |
| BPCRL: BREAK POINT CONTROL REGISTER | BPCRL | CF |
| PROGRAM STATUS WORD | PSW | D0 |
| D1→DF IS USED FOR SCRATCH PAD | | D1→DF |
| ACCUMULATOR | A | E0 |
| INTERRUPT ENABLE REGISTER-1 | IE1 | E8 |
| B REGISTER | B | F0 |
| RTKTM: RTK TIMER REGISTER | RTKT | F6 |
| VECINT: VECTOR INTERRUPT REGISTER | VEC1 | F7 |
| INTERRUPT PRIORITY REGISTER-1 | IP1 | F8 |
| PCL: PC COPY REGISTER (LB) | PCL | F9 |
| PCH: PC COPY REGISTER (HB) | PCH | FA |
| WDCSR: WATCHDOG TIMER CONTROL AND STATUS REGISTER | WDCR | FB |
| MCNFG: MCU CONFIGURATION REGISTER | MCNFG | FC |
| WSGEN: WAIT-STATE GENERATOR REGISTER | WSGEN | FD |
| DSOVL: DATA-SPACE AND OVERLAY DEFINITION REGISTER | OVLAY | FE |
| BANK: BANK SELECT REGISTER | BANK | FF |

| 7 | 6 | 5 | 4 | 3 | 2 | 1 | 0 |
|---|---|---|---|---|---|---|---|
| A7 | A6 | A5 | A4 | A3 | A2 | A1 | A0 |
| R/W | R/W | R/W | R/W | R/W | R/W | R/W | R/W |

| BIT | NAME | RESET | FUNCTION |
|---|---|---|---|
| 7-0 | A[7:0] | 00h | SET-1: LOW-BYTE OF BREAK POINT ADDRESS |

170

| 7 | 6 | 5 | 4 | 3 | 2 | 1 | 0 |
|---|---|---|---|---|---|---|---|
| A15 | A14 | A13 | A12 | A11 | A10 | A9 | A8 |
| R/W | R/W | R/W | R/W | R/W | R/W | R/W | R/W |

| BIT | NAME | RESET | FUNCTION |
|---|---|---|---|
| 7-0 | A[15:8] | 00h | SET-1: HIGH-BYTE OF BREAK POINT ADDRESS |

172

| 7 | 6 | 5 | 4 | 3 | 2 | 1 | 0 |
|---|---|---|---|---|---|---|---|
| BEN | RSV | RSV | RSV | B3 | B2 | B1 | B0 |
| R/W | R/O | R/O | R/O | R/W | R/W | R/W | R/W |

| BIT | NAME | RESET | FUNCTION |
|---|---|---|---|
| 3-0 | B[3:0] | 0h | SET-1 OF BANK, BREAK POINT ADDRESS |
| 6-4 | RSV | 0h | RESERVED=0 |
| 7 | BEN | 0 | BANK, BREAK POINT ENABLE/DISABLE BIT<br>BEN=0 BANK, BREAK POINT ADDRESS IS DISABLED<br>BEN=1 BANK, BREAK POINT ADDRESS IS ENABLED |

| 7 | 6 | 5 | 4 | 3 | 2 | 1 | 0 |
|---|---|---|---|---|---|---|---|
| A7 | A6 | A5 | A4 | A3 | A2 | A1 | A0 |
| R/W | R/W | R/W | R/W | R/W | R/W | R/W | R/W |

| BIT | NAME | RESET | FUNCTION |
|---|---|---|---|
| 7-0 | A[7:0] | 00h | LOW-BYTE OF THE JUMP TO MONITOR ADDRESS |

180

| 7 | 6 | 5 | 4 | 3 | 2 | 1 | 0 |
|---|---|---|---|---|---|---|---|
| A15 | A14 | A13 | A12 | A11 | A10 | A9 | A8 |
| R/W | R/W | R/W | R/W | R/W | R/W | R/W | R/W |

| BIT | NAME | RESET | FUNCTION |
|---|---|---|---|
| 7-0 | A[15:8] | 00h | HIGH-BYTE OF THE JUMP TO MONITOR ADDRESS |

| 7 | 6 | 5 | 4 | 3 | 2 | 1 | 0 |
|---|---|---|---|---|---|---|---|
| A7 | A6 | A5 | A4 | A3 | A2 | A1 | A0 |
| R/W | R/W | R/W | R/W | R/W | R/W | R/W | R/W |

| BIT | NAME | RESET | FUNCTION |
|---|---|---|---|
| 7-0 | A[7:0] | 00h | STACK ADDRESS, USED TO COMPARE AGAINST THE STACK. IF A TRAP CONDITION IS DETECTED A LJMP TO MONITOR WILL BE INSERTED. |

| 7 | 6 | 5 | 4 | 3 | 2 | 1 | 0 |
|---|---|---|---|---|---|---|---|
| P7 | P6 | P5 | P4 | P3 | P2 | P1 | P0 |
| R/O | R/O | R/O | R/O | R/O | R/O | R/O | R/O |

| BIT | NAME | RESET | FUNCTION |
|---|---|---|---|
| 7-0 | P[7:0] | 00h | LOW BYTE OF THE PC. THIS VALUE IS LATCHED BY THE BREAK POINT LOGIC AND CAN BE READ ONLY BY MCU. MONITOR WILL USE THIS ADDRESS TO RESUME THE APPLICATION. |

220

| 7 | 6 | 5 | 4 | 3 | 2 | 1 | 0 |
|---|---|---|---|---|---|---|---|
| P15 | P14 | P13 | P12 | P11 | P10 | P9 | P8 |
| R/O | R/O | R/O | R/O | R/O | R/O | R/O | R/O |

| BIT | NAME | RESET | FUNCTION |
|---|---|---|---|
| 7-0 | P[7:0] | 00h | HIGH BYTE OF THE PC. THIS VALUE IS LATCHED BY THE BREAK POINT LOGIC AND CAN BE READ ONLY BY MCU. MONITOR WILL USE THIS ADDRESS TO RESUME THE APPLICATION. |

| 7 | 6 | 5 | 4 | 3 | 2 | 1 | 0 |
|---|---|---|---|---|---|---|---|
| BPE | STE | S1 | S0 | BE4 | BE3 | BE2 | BE1 |
| R/W | R/W | R/W | R/W | R/W | R/W | R/W | R/W |

| BIT | NAME | RESET | FUNCTION | |
|---|---|---|---|---|
| 0 | BE1 | 0 | ADDRESS BREAK POINT-1 CONTROL BIT | |
| | | | BE1=0 | ADDRESS BREAK POINT-1 IS DISABLED |
| | | | BE1=1 | ADDRESS BREAK POINT-1 IS ENABLED. IF A MATCH IS DECODED, THE JUMP LOGIC WILL BE TRIGGERED. |
| 1 | BE2 | 0 | ADDRESS BREAK POINT-2 CONTROL BIT | |
| | | | BE2=0 | ADDRESS BREAK POINT-2 IS DISABLED |
| | | | BE2=1 | ADDRESS BREAK POINT-2 IS ENABLED. IF A MATCH IS DECODED, THE JUMP LOGIC WILL BE TRIGGERED. |
| 2 | BE3 | 0 | ADDRESS BREAK POINT-3 CONTROL BIT | |
| | | | BE3=0 | ADDRESS BREAK POINT-3 IS DISABLED |
| | | | BE3=1 | ADDRESS BREAK POINT-3 IS ENABLED. IF A MATCH IS DECODED, THE JUMP LOGIC WILL BE TRIGGERED. |
| 3 | BE4 | 0 | ADDRESS BREAK POINT-4 CONTROL BIT | |
| | | | BE4=0 | ADDRESS BREAK POINT-4 IS DISABLED |
| | | | BE4=1 | ADDRESS BREAK POINT-4 IS ENABLED. IF A MATCH IS DECODED, THE JUMP LOGIC WILL BE TRIGGERED. |
| 5-4 | S[1:0] | 00b | STACK TRAP CONDITION<br>00b=NO STACK TRAP (STACK TRAP IS DISABLED)<br>01b=STACK TRAP ON SP=SBK<br>10b=STACK TRAP ON SP<SBK<br>11b=STACK TRAP ON SP>SBK | |
| 6 | STE | 0 | SINGLE STEP ENABLE/DISABLE CONTROL BIT.<br>SEE SINGLE STEP FOR MORE EXPLANATION.<br>STE=0 SINGLE STEP IS DISABLE<br>STE=1 SINGLE STEP IS ENABLED | |
| 7 | BPE | 0 | GLOBAL DEBUGGER ENABLE/DISABLE CONTROL BIT | |
| | | | BPE=0 | THE DEBUGGER LOGIC IS DISABLED. NO BREAK CAN HAPPEN. HOWEVER WRITING TO ALL DEBUGGER REGISTERS IS POSSIBLE. |
| | | | BPE=1 | THE DEBUGGER LOGIC IS ENABLED |

| 7 | 6 | 5 | 4 | 3 | 2 | 1 | 0 |
|---|---|---|---|---|---|---|---|
| RES | EA | SSP | SB | B4 | B3 | B2 | B1 |
| W/O | R/O | R/O | R/O | R/O | R/O | R/O | R/O |

| BIT | NAME | RESET | FUNCTION | |
|---|---|---|---|---|
| 0 | B1 | 0 | ADDRESS BREAK POINT-1 STATUS BIT | |
| | | | B1=0 | ADDRESS BREAK POINT-1 DIDN'T CAUSED A BREAK CONDITION |
| | | | B1=1 | INDICATES THAT ADDRESS BREAK POINT-1 CAUSED THE BREAK CONDITION. THIS BIT WILL BE CLEARED WHEN MCU WRITE "80h" TO THIS REGISTER. |
| 1 | B2 | 0 | ADDRESS BREAK POINT-2 STATUS BIT | |
| | | | B2=0 | ADDRESS BREAK POINT-2 DIDN'T CAUSED A BREAK CONDITION |
| | | | B2=1 | ADDRESS BREAK POINT-2 CAUSED THE BREAK CONDITION. THIS BIT WILL BE CLEARED WHEN MCU WRITE "80h" TO THIS REGISTER. |
| 2 | B3 | 0 | ADDRESS BREAK POINT-3 STATUS BIT | |
| | | | B3=0 | ADDRESS BREAK POINT-3 DIDN'T CAUSED A BREAK CONDITION |
| | | | B3=1 | ADDRESS BREAK POINT-3 CAUSED THE BREAK CONDITION. THIS BIT WILL BE CLEARED WHEN MCU WRITE "80h" TO THIS REGISTER. |
| 3 | B4 | 0 | ADDRESS BREAK POINT-4 STATUS BIT | |
| | | | B4=0 | ADDRESS BREAK POINT-4 DIDN'T CAUSED A BREAK CONDITION |
| | | | B4=1 | ADDRESS BREAK POINT-4 CAUSED THE BREAK CONDITION. THIS BIT WILL BE CLEARED WHEN MCU WRITE "80h" TO THIS REGISTER. |
| 4 | SB | 0 | STACK TRAP STATUS BIT | |
| | | | SB=0 | STACK TRAP DIDN'T CAUSED A BREAK CONDITION |
| | | | SB=1 | STACK TRAP CAUSED THE BREAK CONDITION. THIS BIT WILL BE CLEARED WHEN MCU WRITE "80h" TO THIS REGISTER. |
| 5 | SSP | 0 | SINGLE STEP BREAK POINT STATUS BIT | |
| | | | SSP=0 | SINGLE STEP BREAK POINT DIDN'T CAUSED A BREAK CONDITION |
| | | | SSP=1 | SINGLE STEP BREAK POINT CAUSED THE BREAK CONDITION. THIS BIT WILL BE CLEARED WHEN MCU WRITE "80h" TO THIS REGISTER. |
| 6 | EA | 0 | REFLECTS THE REAL VALUE OF EA BIT WHEN IN DEBUG MODE. SEE SINGLE STEP FOR MORE EXPLANATION. EA=0 INTERRUPT IS DISABLED EA=1 INTERRUPT IS ENABLED | |
| 7 | RES | 0 | RESUME CONTROL BIT. WRITING A "80h" TO THIS REGISTER WILL WRITE-PROTECT ESFR(BE-CF), ENABLE THE PCL/PCH UPDATE AND CLEAR B[4:1] BITS. THIS BIT IS READ AS "0". WRITING A "55h" TO THIS REGISTER WILL UNPROTECT ESFR[BE-CF] BUT NOT CLEAR THE STATUS BITS. | |

APPARATUS AND METHOD FOR MICROCONTROLLER DEBUGGING

TECHNICAL FIELD

The present invention relates generally to microcontrollers, and more particularly to an apparatus and method for microcontroller and embedded microcontroller debugging.

BACKGROUND

Microcontrollers are well known in the electronic design industry, and include the MCS®51 microcontroller family, available for many years from Intel®, Santa Clara, Calif. An overview of the basic architecture and features of this microcontroller family is provided in "An Introduction to the Intel® MCS®51 Single-Chip Microcomputer Family," Application Note AP-69, by John Wharton, May 1980, which is hereby incorporated herein by reference. Additional features and capabilities, such as faster speed, more memory and programmable counter arrays, have been introduced to the MCS®51 family since this application note was written, although the primary functionality is still relatively the same.

Generally, a microcontroller has a standard hardware design that is customized for a particular implementation by programming the firmware for a specific application. Microcontrollers thus generally have the advantage of combining relatively inexpensive, generic hardware with specialized firmware to provide cost-effective custom designs for many different applications. Furthermore, modifications and improvements may be made, even after a product has been sold, simply by reprogramming the device.

The architecture of specific microcontrollers can vary from manufacturer to manufacturer, and from product to product. For example, a microcontroller integrated circuit ("IC") may consist essentially of a microprocessor or central processing unit ("CPU"), or a microcontroller may comprise a microprocessor plus on-chip memory and peripherals, such as timers, counters, and serial ports.

Generally, while a microcontroller reduces the cost of and shortens the time it takes to design, debug and manufacture a specialized integrated circuit, the firmware which controls the operation of a microcontroller is specialized and must itself be designed and debugged for each application. Typically, the firmware is developed and first tested on a simulator before being run in the microcontroller. In a simulation, the architecture of the microcontroller is simulated on a host computer, and the firmware written in the instruction set of the microcontroller is executed on the host computer. The simulator allows the developer to debug the firmware by monitoring the firmware's execution, viewing the values in registers and memory, displaying the microcontroller's status. The developer may also single step the firmware, or set breakpoints to halt execution of the firmware upon detection of a specific event, such as the access of a particular memory location.

One disadvantage to using a simulator is that the hardware, including the microcontroller, is simulated on the host system, and it is difficult to precisely simulate the hardware in the actual product, and all of the events that will occur in using the actual product. Therefore the firmware may also be debugged using an emulator, in which the actual product hardware is tested, except for the microcontroller IC itself. Generally, an emulator replaces the microcontroller IC in the product with a connector that plugs into the socket for the microcontroller, providing an interface to a development system that emulates the microcontroller. An emulator has the advantage over a simulator of being able to test the firmware in the environment of the actual product or at least a prototype of the product, while retaining the monitoring and control functions of the development system.

For example, a program can be executed step by step while the status is monitored, or break points may be used, as with a simulator. In addition, the microcontroller's interface to the other hardware in the actual product may be tested, providing a more realistic test environment than with a simulator. After debugging the firmware with an emulator, the firmware may be loaded into the memory (e.g., ROM or RAM) of the microcontroller and run through final testing.

One problem with microcontrollers, however, is that they are often used in embedded systems in which it is difficult to gain access to the microcontroller external signals. Thus it may be impossible or impractical to substitute an external emulator for the microcontroller IC to debug the firmware.

Another problem with microcontrollers is that some use non-standard hardware, or have hardware that may be configured by the user, and an external microcontroller emulator may not be available for debugging a non-standard microcontroller.

Another disadvantage with prior art emulators is that they are typically expensive, and an emulator may not be available for debugging a particular developer's firmware. Also, an emulator may be available for a project, but may not be available to test a microcontroller located in the field or at a remote site.

SUMMARY OF THE INVENTION

These and other problems are generally solved or circumvented, and technical advantages are generally achieved, by preferred embodiments of the present invention in which debugger circuitry is implemented on the microcontroller IC itself. The on-chip debugger may break application program execution upon detection of a specified condition, display internal register values to the user, and continue the application program execution.

The on-chip debugger may provide functions similar to those of an external simulator or emulator. For example, the on-chip debugger may provide address or stack pointer break points, enabling the interruption of the application program execution upon detection of user selected breakpoint conditions. The debugger circuitry may then jump to a special monitor program, which takes control of the microcontroller. The monitor program may display the status of the microcontroller to a user, for example by displaying internal register and memory values via user interface registers. The monitor program may also allow single step execution of the application program. In addition, breakpoints may be changed by the user. The monitor program may then return to the interrupted location in the application program and relinquish control of the microcontroller to the application program.

In accordance with a preferred embodiment of the present invention, a method of debugging a microcontroller integrated circuit comprises storing a breakpoint address in a hardware register on the microcontroller integrated circuit; executing an application program from program memory by the microcontroller; comparing application program instruction addresses to the breakpoint address; halting execution of the application program upon detection of an instruction fetch from a memory address equal to the breakpoint address; substituting a jump instruction to a debug program for the instruction fetched from the memory address; and executing the debug program. In another preferred embodiment, the method may further comprise storing a stack trap address in a stack breakpoint hardware register on the microcontroller; comparing stack pointer addresses to the stack breakpoint address; and upon detection of a valid stack pointer address comparison, performing the halting execution, the substituting the jump instruction, and the executing the debug program steps.

In accordance with another preferred embodiment of the present invention, a microcontroller integrated circuit comprises a program memory; a program counter coupled to the program memory for selecting address locations in the memory; instruction execution circuitry coupled to the program memory for executing instructions received from the memory; a breakpoint address register for storing a breakpoint address; address compare circuitry for comparing a value in the program counter to a value in the breakpoint address register, the compare circuitry providing a breakpoint signal upon detection of a valid breakpoint address comparison; and a multiplexer interposed between the program memory and the program execution circuitry, the multiplexer comprising circuitry for inserting a debug instruction into the instruction execution circuitry upon receipt of the breakpoint signal, wherein the debug instruction is substituted for an instruction in a program memory address pointed to by the program counter. In another preferred embodiment, the microcontroller IC may further comprise a stack pointer register; a stack breakpoint register for storing a stack trap address; stack pointer compare circuitry for comparing a value in the stack pointer register to a value in the stack breakpoint register, the stack pointer compare circuitry providing a stack trap signal upon detection of a valid stack pointer address comparison; and wherein the multiplexer inserts the debug instruction into the instruction execution circuitry upon receipt of the stack trap signal.

An advantage of a preferred embodiment of the present invention is that it allows for the debugging of firmware in embedded microcontroller systems where physical access to the microcontroller may be difficult.

Another advantage of a preferred embodiment of the present invention is that it may be implemented in a microcontroller for which there is no emulator available. For example, the microcontroller hardware maybe non-standard, or a developer may not have an emulator.

A further advantage of a preferred embodiment of the present invention is that it provides an easy and cost effective method for developing firmware without requiring an expensive or custom-made microcontroller emulator.

Yet another advantage of a preferred embodiment of the present invention is that it works with the application program running in real time, and provides debugging information without slowing down the application program execution speed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 12 is a table illustrating the special function register map;

FIG. 13 is a set of tables illustrating breakpoint address and bank register definitions;

FIG. 14 is a set of tables illustrating monitor entry address register definitions;

FIG. 15 is a table illustrating the stack breakpoint register definition;

FIG. 16 is a table illustrating the breakpoint control register definition;

FIG. 17 is a table illustrating breakpoint status register definition; and

FIG. 18 is a set of tables illustrating program counter copy register definitions.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely as applied to the M8051 microcontroller. The invention may be applied, however, to other microcontrollers in the MCS®51 microcontroller family, and to microcontrollers produced by other manufacturers, which may have different word lengths, instruction sets, hardware architecture, etc. The invention is preferably useful for applications in which a microcontroller is embedded in a system and difficult to access, or in which an emulator does not exist or is unavailable, or for quick firmware tests or field firmware tests. The applications in which the invention may be used are as wide and varied as the applications in which microcontrollers may be used. Applications include real-time control, signal processing, automotive, industrial processes, electronic equipment, computer, Internet and communications equipment, and so forth. As specific examples, a preferred embedded microcontroller may be used in general purpose bus bridge controllers, such as Universal Serial Bus ("USB") controllers, USB wireless base stations and USB keyboard controllers in the computer electronics field.

Figure 1:
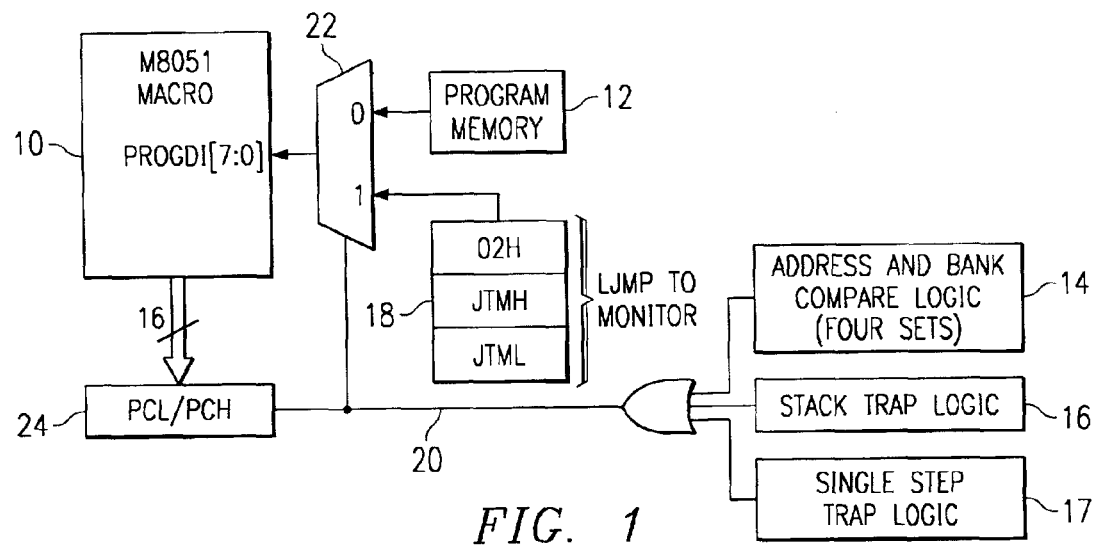
FIG. 1 is a block diagram illustrating breakpoint and jump instruction insertion logic.

FIG. 1 is a high level block diagram of a preferred embodiment debugger implemented on a microcontroller IC. The debugger preferably comprises debugger hardware circuitry and a debug or monitor program. In normal operation, M8051 Macro 10 receives program instructions from program memory 12 for execution of the normal application program. The debugger circuitry contains four sets of address break point registers and compare logic 14 and one set of stack pointer registers and stack trap logic 16 to define break point conditions. When any break point condition occurs, a monitor program is injected into the microcontroller program execution. The monitor program takes control of the microcontroller from the application program and allows display of internal register values to a user interface, for example. The break point related function registers may be changed for the next break point condition by developer input. In addition, single step trap logic 17 allows a developer to single step through the application program, effectively trapping the application and invoking the monitor program on every application program instruction.

The debugger circuitry causes the execution of monitor program by inserting a "long jump" to monitor program instruction 18 via the program mux control signal 20 upon detection of a break point condition. The substitution of the jump to monitor instruction for the interrupted application program instruction is performed by instruction multiplexer 22. On the first cycle, a 02 h long jump instruction is inserted, followed by the monitor program high byte address in the second cycle and the monitor program low byte address in the third cycle. The breakpoint address is saved in program counter copy register 24 to allow a return to the application program upon completion of the monitor program functions.

Figure 2:
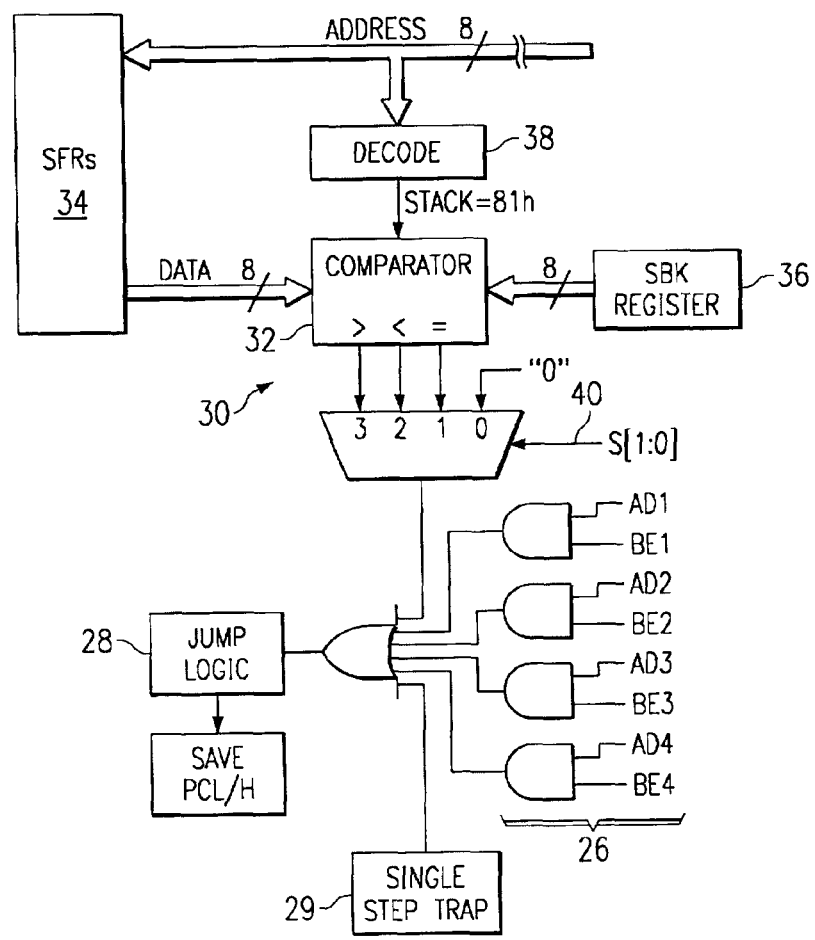
FIG. 2 is a block diagram illustrating stack breakpoint logic.

FIG. 2 is a block diagram illustrating further detail of the address and stack trap comparison logic. Address breakpoint circuitry 26 compares the four address breakpoint signals AD1:4 with their respective breakpoint enable signals BE1:4, and activates jump logic 28 if an address matches a breakpoint and the corresponding breakpoint enable signal is active. Single step trap circuitry 29 activates the jump logic 28 if the single step debug function is enabled. Address breakpoints are preferably set for exact address matches, although more complicated functions, such as less than or greater than, may be implemented.

Stack trap logic 30 preferably implements equal to, less than and greater than comparisons for stack pointer address comparisons. Decode circuitry 38 detects an access to the stack pointer register in special function registers 34 and instructs comparator 32 to compare the value from the stack pointer register to the value stored in stack breakpoint register 36. Stack comparison select 40 determines whether the comparison is selected as equal to, greater than, less than, or disabled. If a comparison is selected and is valid, stack trap logic 30 activates jump logic 28. Preferably the stack trap is activated only when writing data to the stack, although it may also be activated when retrieving data from the stack.

Figure 3:
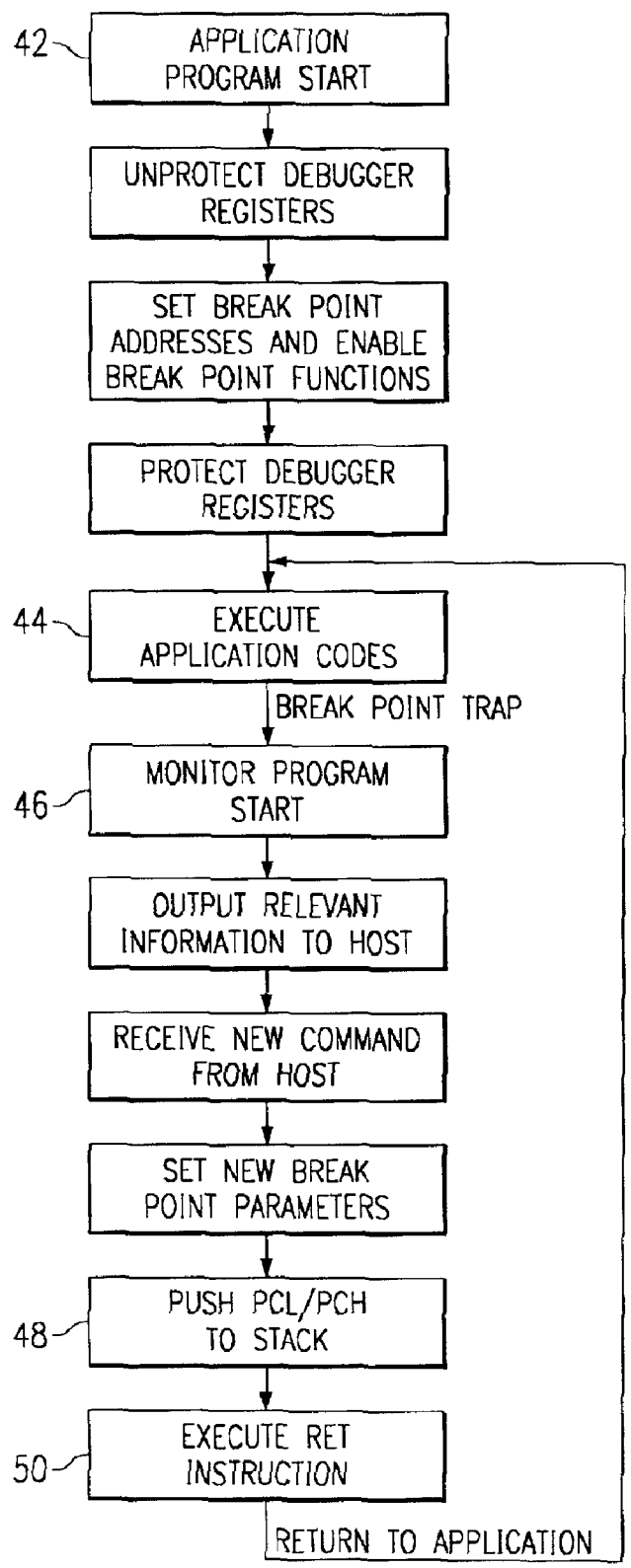
FIG. 3 is a flow chart illustrating a monitor program interrupting an application program at a breakpoint.

FIG. 3 is a flow chart showing overall operation of the debugger. The application program starts in step 42, after which the debugger registers are unprotected to allow modification of their contents. Once break point addresses are set and breakpoint functions are enabled, the debugger registers are write protected to prohibit any unintentional changes. Normal operation of the application program is performed in step 44, until a breakpoint is detected.

Upon a breakpoint trap, the monitor program begins execution in step 46. At this point the debugger registers may be unprotected. Then relevant information may be output to the host, new commands may be received from the host, and new breakpoints may be set. The monitor program may be user-defined, so the exact information output and commands input depend on the specific application. The monitor program is preferably written by the user to be simple at first to help ensure that it will work properly to assist in debugging. Once it is determined to be working properly, the monitor program functions may be made more complicated. To complete monitor program execution, the debugger registers are again write protected, the interrupted application program address value saved in the program high/low byte address registers is pushed to the stack in step 48, and a return instruction is executed in step 50 so that the program address will be popped off the stack to return to the application program at the same place in which it was interrupted.

As an example, the hardware breakpoint and monitor may function in the following manner. For initialization, the monitor program writes 55 h to the breakpoint status register to unprotect the debugger registers. The monitor program sets the breakpoint address and enables the breakpoint function. The monitor program pushes the starting address of the application onto the stack. The monitor program writes an 80 h to the breakpoint status register. This write-protects all debugger registers, and enables program counter copy register updates. The monitor program then executes a return instruction to start the application.

During application program operation, when the application trips a breakpoint, such as one of the breakpoint addresses or the stack trap, a long jump instruction is inserted, followed by the monitor program entry address, which causes a jump to the monitor program. The program counter copy registers hold the resume address. This jump suspends program counter copy register updates, suspends WDT, and unprotects the debugger registers. The monitor program may collect all relevant information and output it to the host, for example, via USB or UART. The monitor program may receive new commands from the host via USB or UART. The monitor program sets new parameters, such as new a breakpoint. The monitor program reads the program counter copy registers and pushes the resume address onto the stack. The monitor program writes an 80 h to the breakpoint status register, which write-protects the debugger registers, enables program counter copy register updates and resumes WDT. Finally, the monitor program executes a return instruction to resume the application program.

Figure 4:
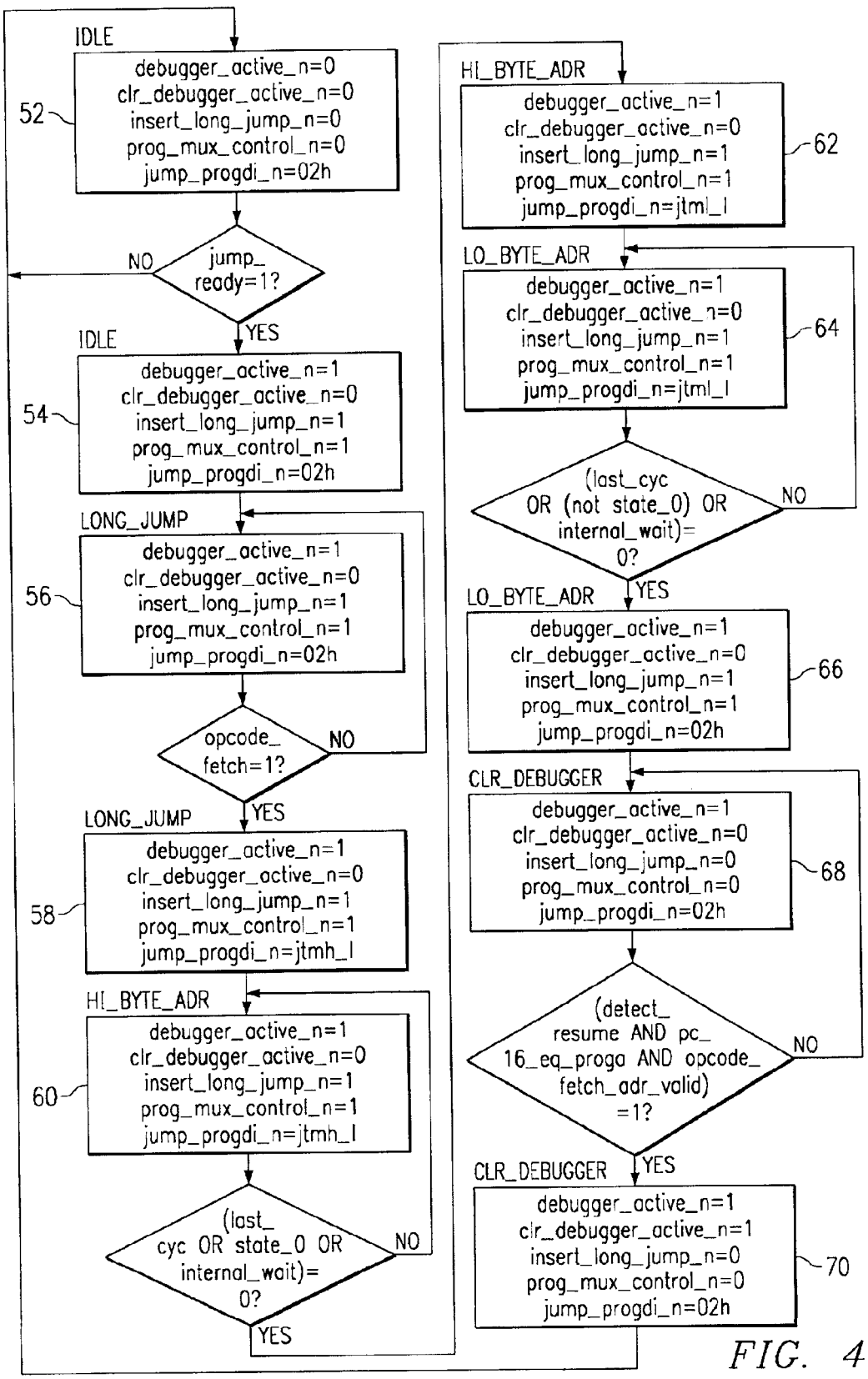
FIG. 4 is a flow chart illustrating a long jump to the monitor program state machine.

FIG. 4 is a flow chart of the long jump to monitor program synchronous state machine. In the chart, the suffix "_n" indicates the next value of a signal, as opposed to its present or current value. Each of the signals used in the flow chart may be found in the figures described herein. Each state transition generally occurs on the rising edge of the clock.

The state machine stays in idle state 52 until a jump_ready signal is received indicating the detection of a breakpoint. The state machine then sets debugger_active_n to 1 to indicate debug mode in idle state 54. This disables the breakpoint interrupt from occurring again, possibly creating an infinite loop or stack overflow. The state machine then prepares to insert the long jump to monitor program instruction by setting insert_long_jump_n and prog_mux_control_n to 1. The state machine must then wait in long_jump state 56 until a valid opcode fetch. This is so that the long jump instruction opcode is inserted into the program during an opcode fetch cycle, and not for an operand fetch cycle. Once an opcode fetch is detected, the long jump instruction is inserted in long_jump state 58.

The high byte address of the monitor program is loaded for use in the long jump in states 60 and 62, when last_cyc and state_0 and internal_wait are 0. In a similar manner, the low byte address of the monitor program is loaded for use in the long jump in states 64 and 66, when last_cyc and (not state_0) and internal_wait are 0. Lastly, the state machine waits in clear debugger state 68 until the signals detect_resume, pc_16_eq_proga and opcode_fetch_adr_valid are 1, at which time the clr_debugger_active_n signal is set to 1 in clear debugger state 70, and the state machine returns to idle state 52 with the debugger_active signal reset.

Figure 5:
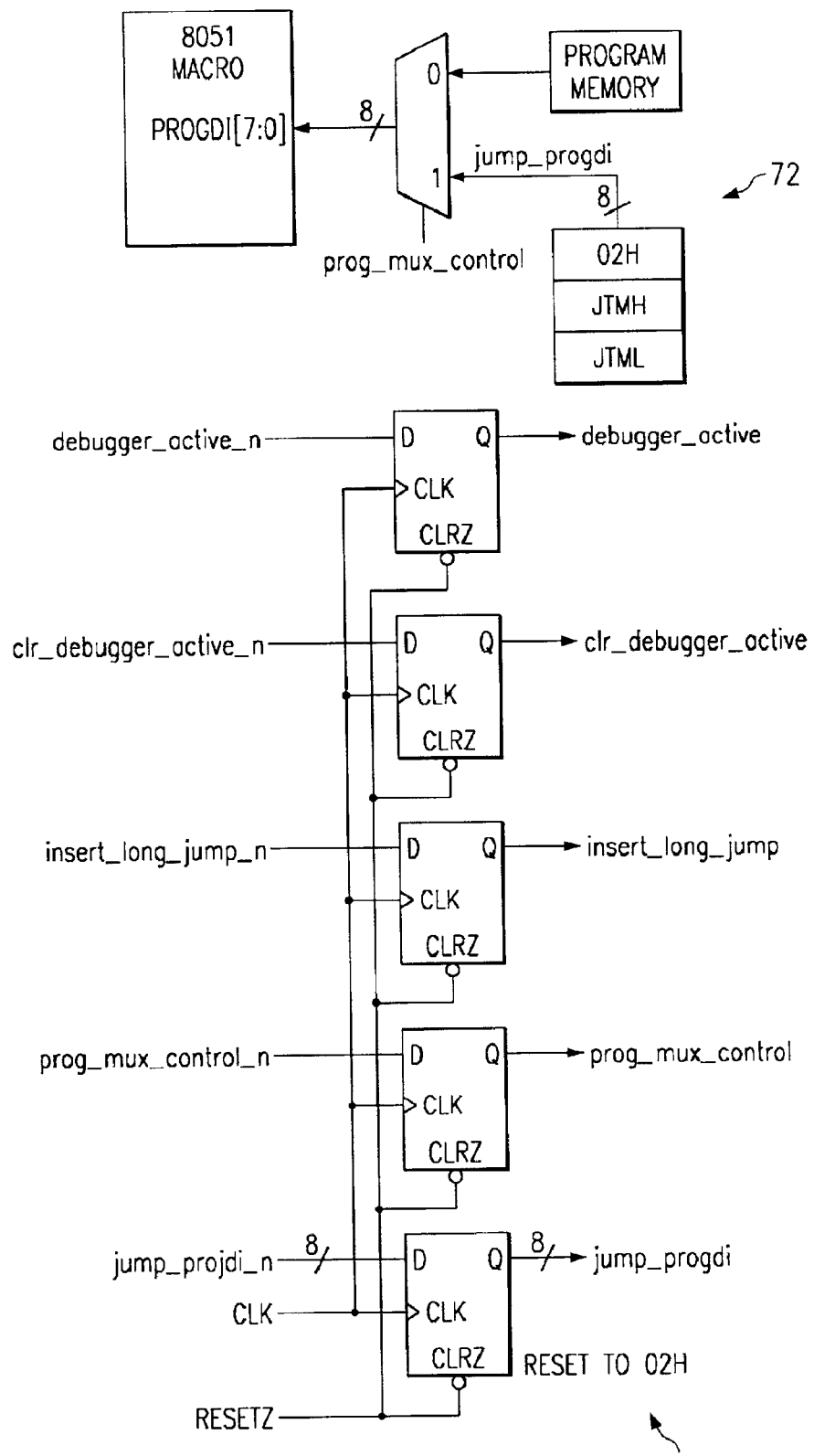
FIG. 5 is a block diagram illustrating program instruction fetch multiplexer and debugger state machine output logic.

FIG. 5 is a block diagram illustrating program instruction fetch multiplexer 72 and debugger state machine output logic 74. The function of prog_mux_control and jump_progdi have previously been described with respect to FIG. 1. The next state signals described in FIG. 4 are shown as inputs to the clocked D-type flip flops, generating the actual clock-synchronized output signals used in the debug circuitry.

Figure 6:
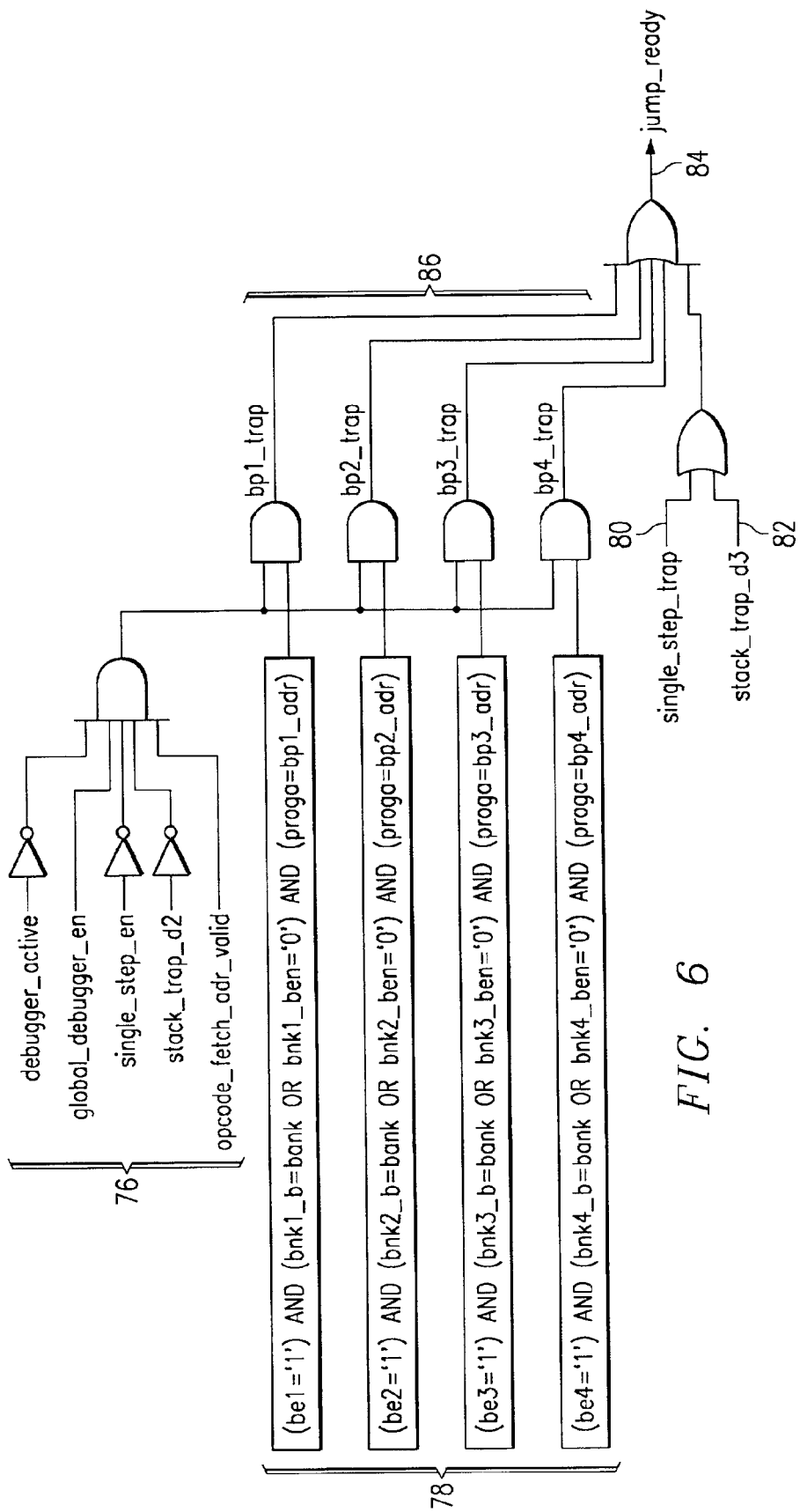
FIG. 6 is a block diagram illustrating address breakpoint and jump ready logic.

FIG. 6 is a block diagram illustrating address breakpoint and jump ready logic for generating jump_ready signal 84, which initiates the debugger state machine shown in FIG. 4. The jump_ready signal 84 may be activated by either the stack trap signal 82 or the single step trap signal 80 or one of the four address breakpoint trap signals 86. In order for the address breakpoint trap signals 86 to be activated, the status signals 76 must be at appropriate levels as indicated in the figure. Debugger active, single step enable and stack_trap d2 must be low, and global debugger enable and opcode fetch address valid must be high. In addition, one of the four breakpoint addresses must match the instruction address as indicated by the compare block 78. To activate breakpoint 1 for example, breakpoint 1 must be enabled, the breakpoint address must match the instruction address, and the appropriate memory bank must be selected. Alternatively, the bank comparison circuitry may not be used or may be disabled.

Figure 7:
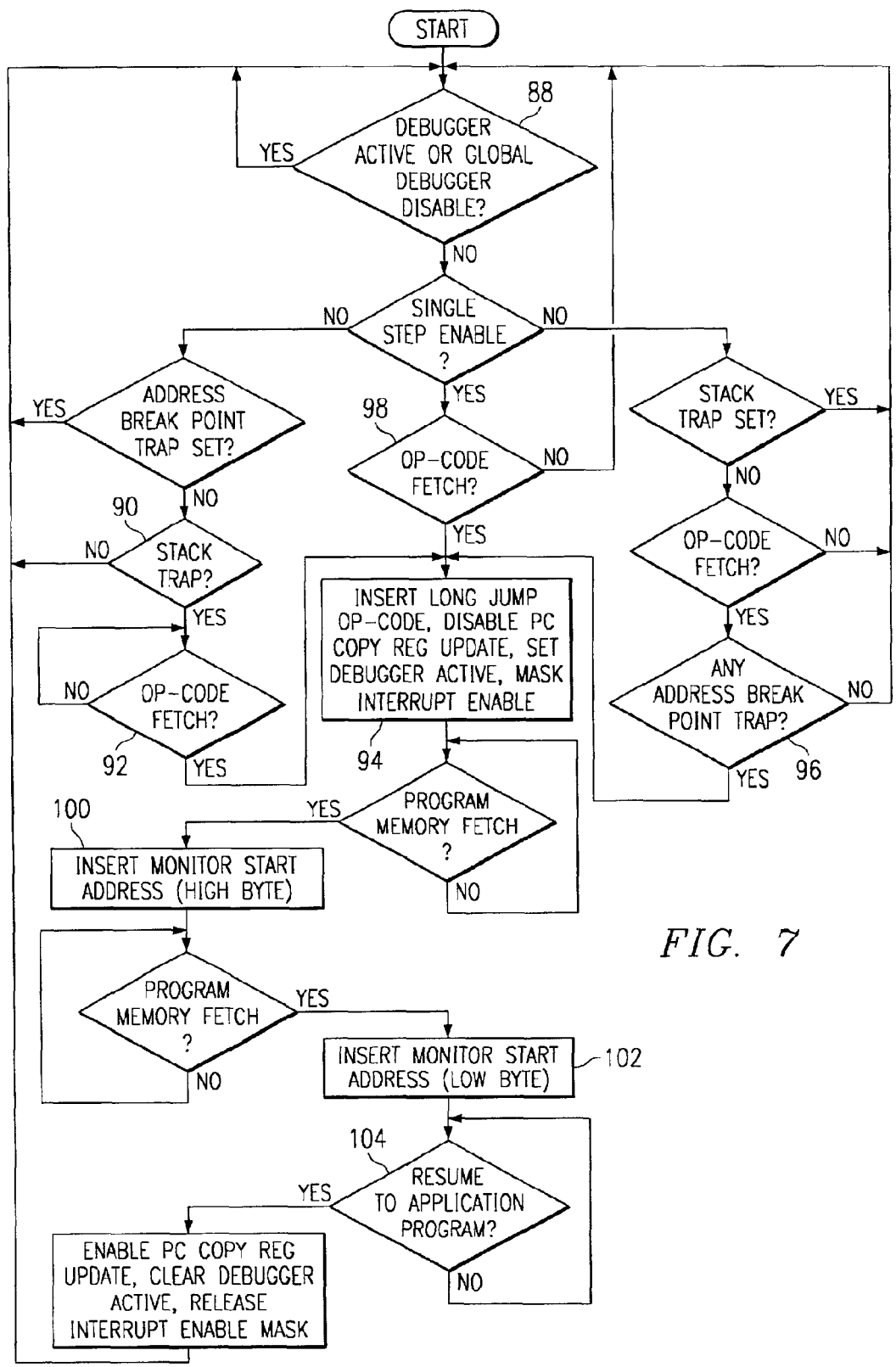
FIG. 7 is a flow chart illustrating debugger circuitry top level logic operation.

FIG. 7 is a flow chart illustrating debugger circuitry top level logic operation for selecting between the various breakpoint options, such as address breakpoints, stack traps, and single step traps. Step 88 tests to make sure the debugger is enabled, and that it is not already active. Preferably, whenever the monitor program is executed, there is only one break point condition is set, although this does not have to be the case. If the debugger is enabled and no break point condition is active, the stack trap function and address break point function work in parallel.

If the stack trap condition occurs first, it disables stack trap detection. If the stack trap is not enabled in step 90, it does not detect a stack trap. If the stack trap is enabled, it waits until the stack trap condition is met and the last cycle of the current instruction is finished in step 92. It then inserts the "long jump" to monitor program instruction at the next instruction fetch in step 94.

If the stack trap is not set, the instruction address is compared with break point address during the next instruction fetch in step 96. Preferably, an address match occurs when the odd number of the address matches the address break point, before the long jump to the monitor program. The even number of the address match occurs when program execution returns to application program from the monitor program, and it should not trigger break point condition. By continuously asserting debugger_active in state CLR_DEBUGGER 70, it prevents returning to application program address to trigger the same breakpoint condition again.

If the single step trap is enabled, then the program waits for an opcode fetch in 140 step 98 and jumps to the monitor program during opcode execution.

In all three cases, after the jump to the monitor program, the debugger jump circuit is automatically disabled to avoid a nested break point condition. The high byte of the monitor start address is inserted in step 100 and the low byte of the monitor start address is inserted in step 102. The program then waits in step 104 to return to the application program.

Figure 8A:
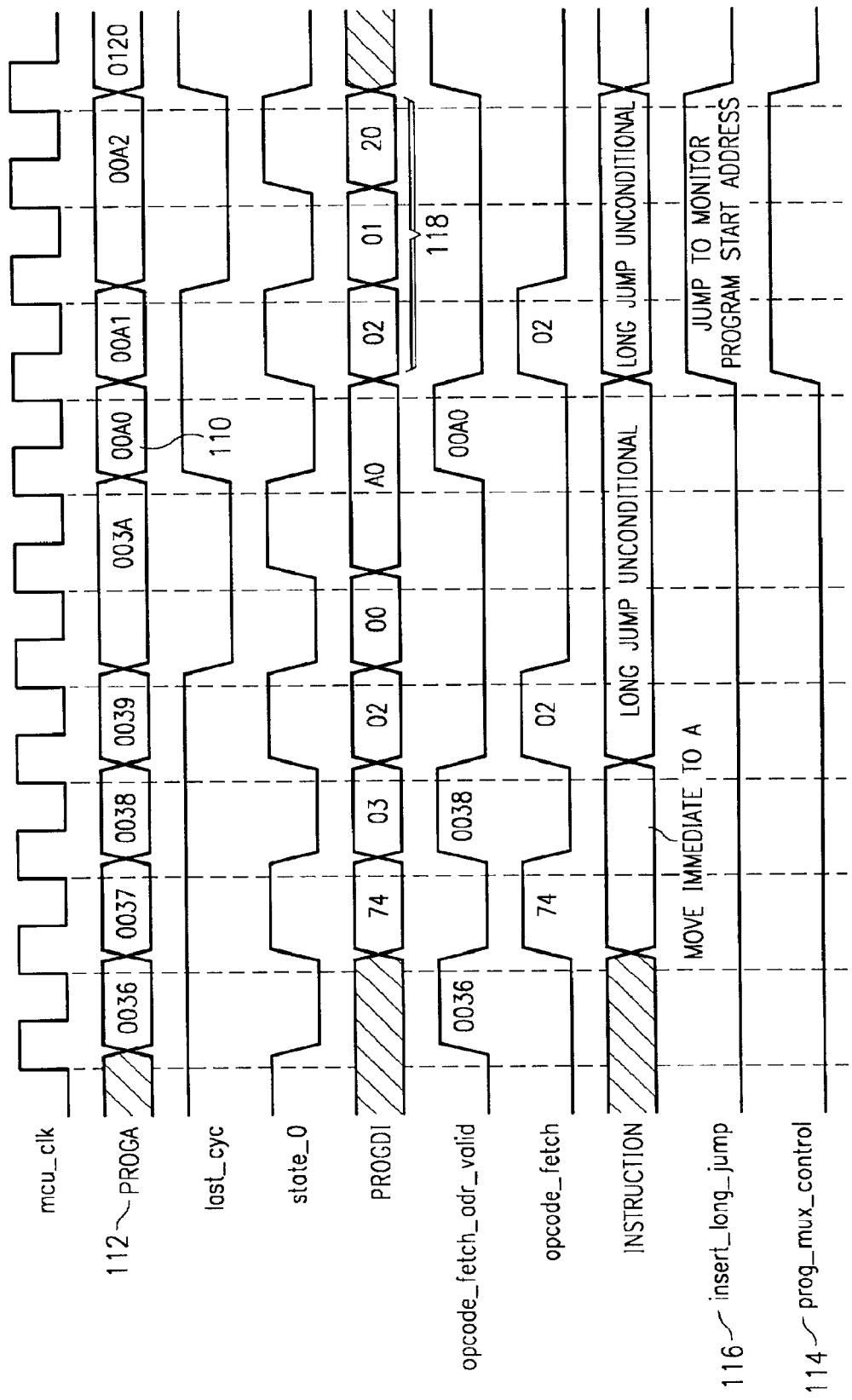
FIGS. 8a–8b are timing diagrams illustrating control signal timing for a monitor program jump and return.
Figure 8B:
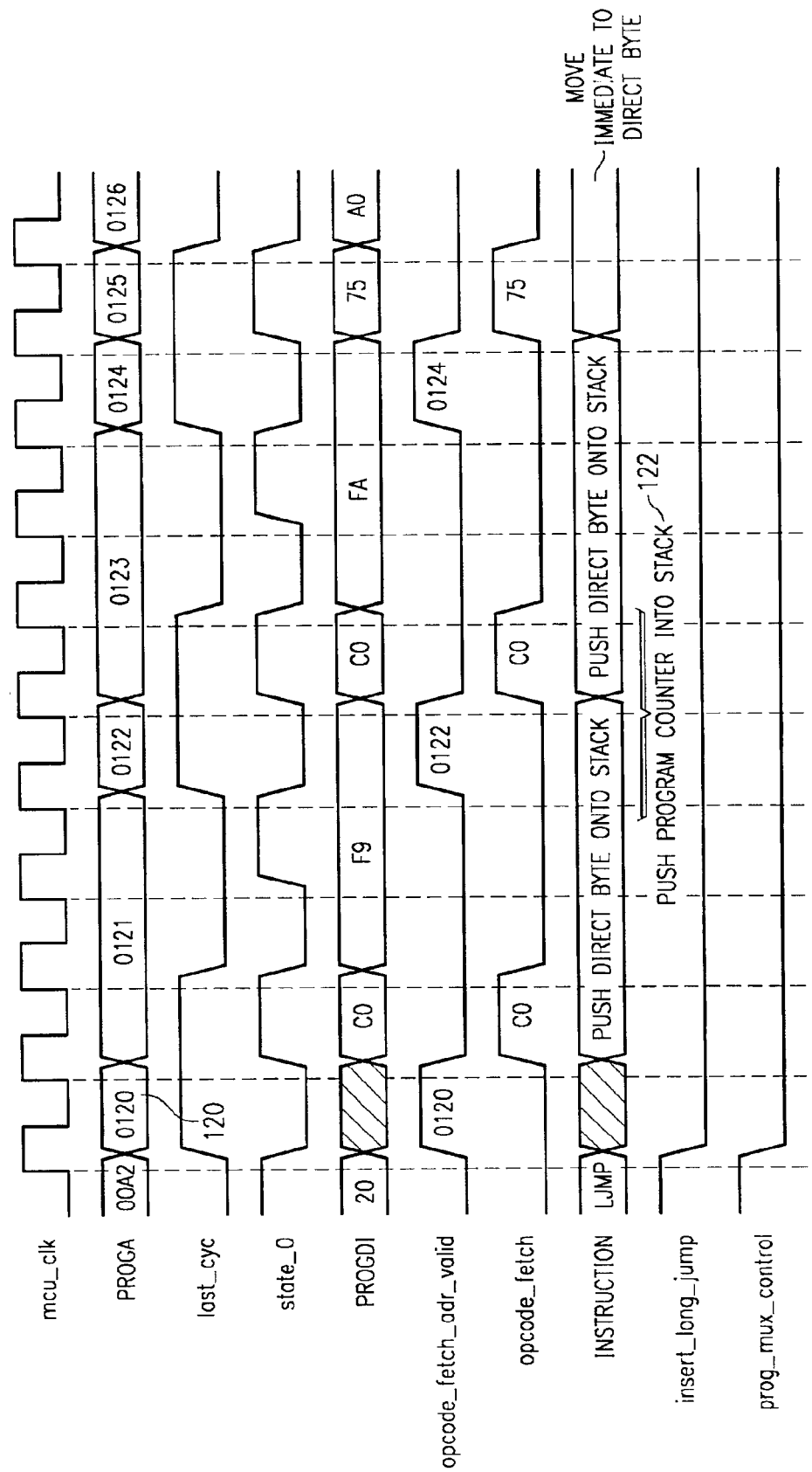

FIGS. 8a–8b are timing diagrams illustrating control signal timing for a monitor program jump and return. A breakpoint is set to detect an address of 00A0, which occurs at point 110 in signal proga 112 in FIG. 8a. The prog_mux control signal 114 and insert_long_jump signal 116 are then activated and the jump to monitor program instruction 118 is inserted with a jump address of 0120. The monitor program takes over program execution at address 0120 at designator 120 in FIG. 8b. The contents of the program counter are then pushed onto the stack with instructions 122.

Figure 9A:
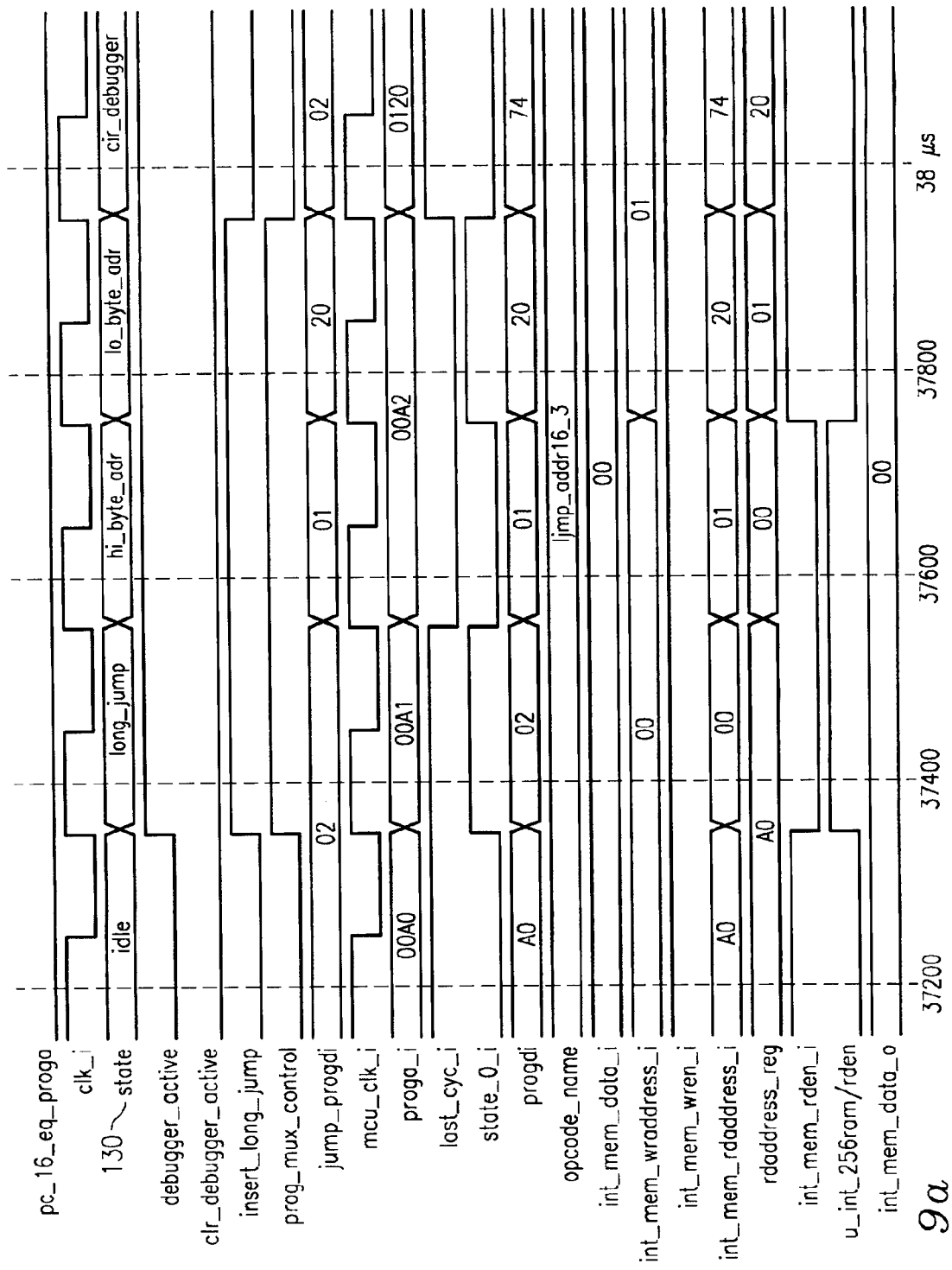
FIGS. 9a–9b are timing diagrams illustrating control signal timing for a monitor program jump and return.
Figure 9B:
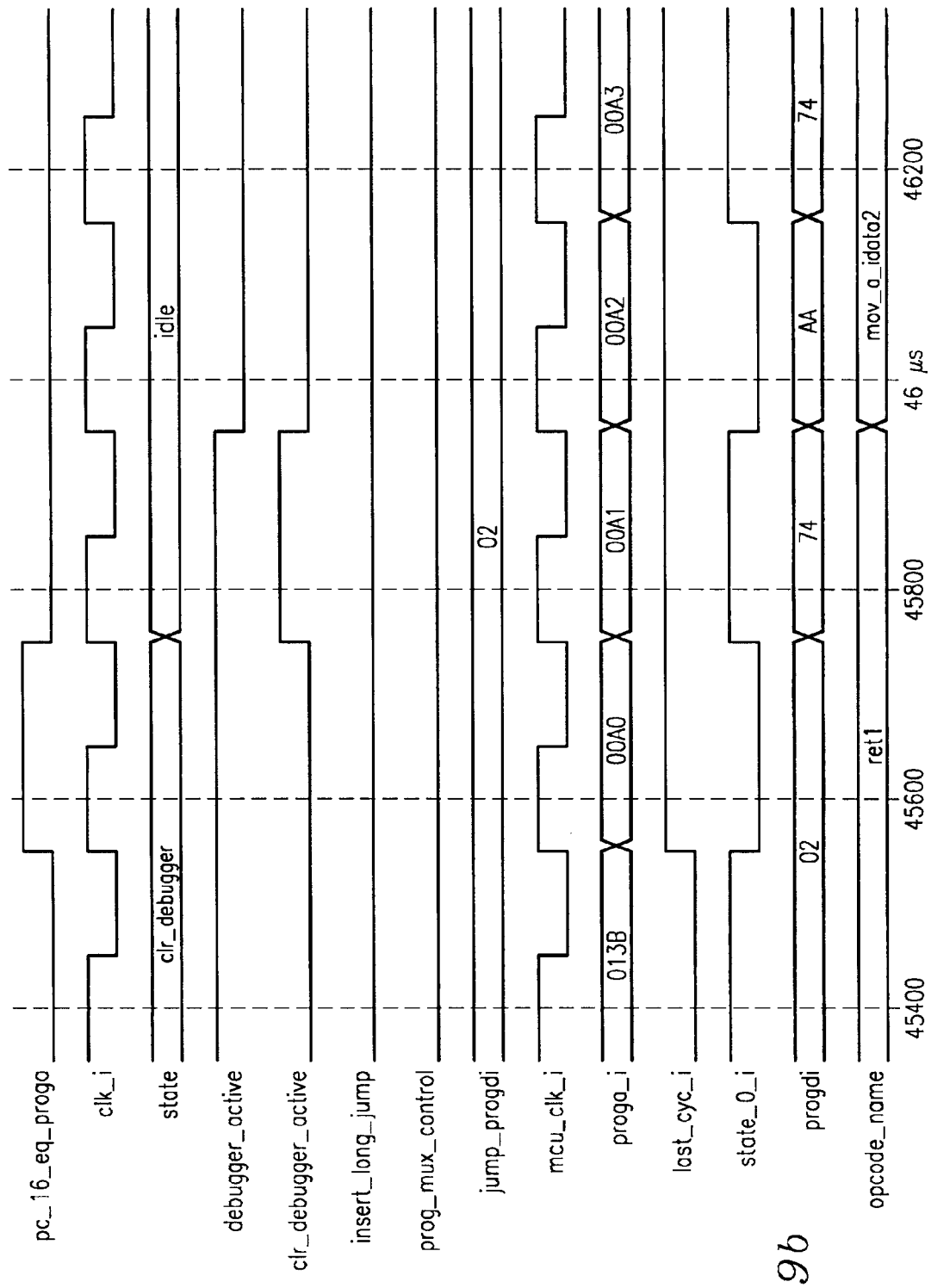

FIGS. 9a–9b are computer generated timing diagrams illustrating control signal timing for a monitor program jump and return. The various states under state 130 correspond to the states shown and described previously in FIG. 4.

Figure 10:
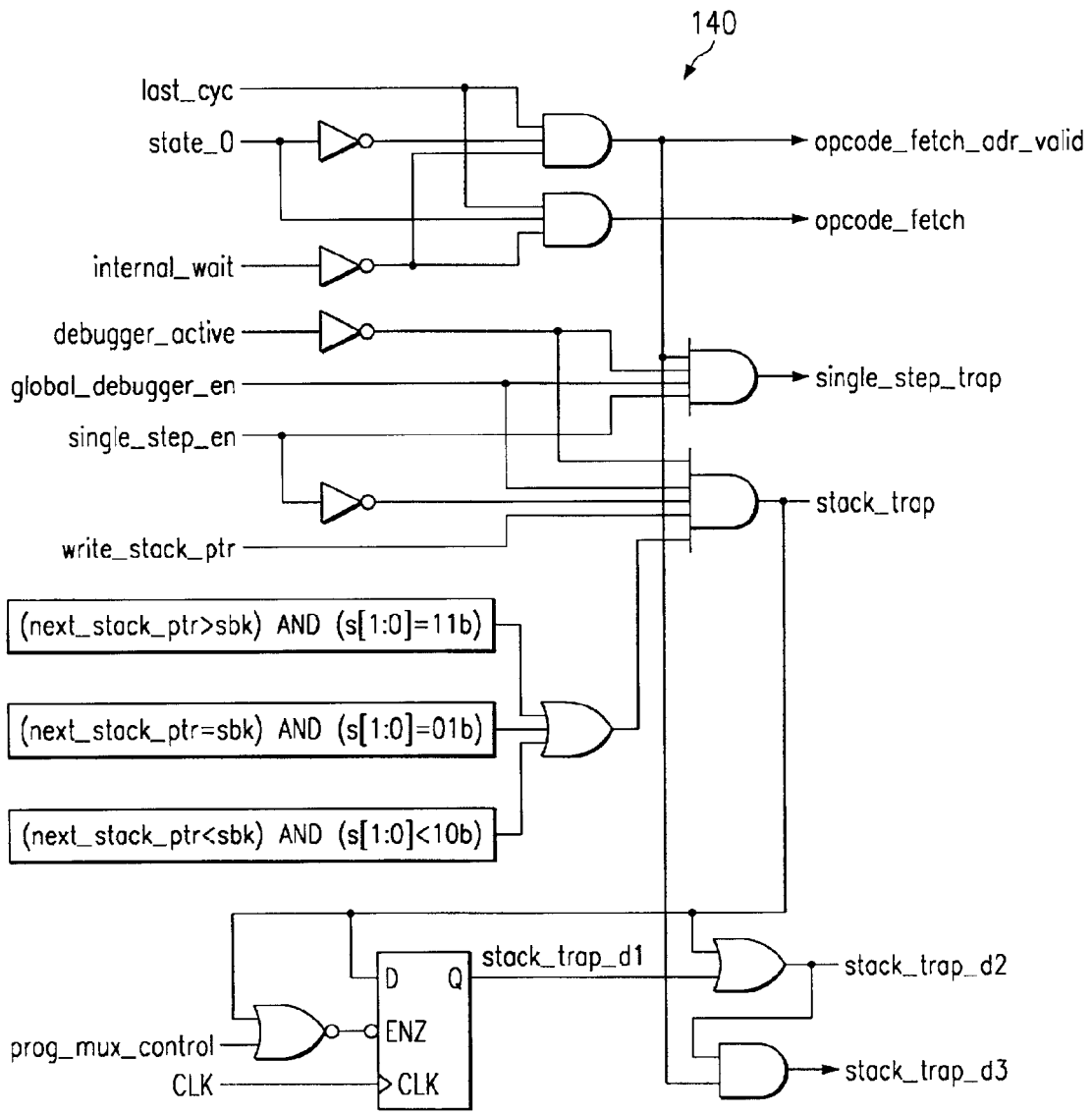
FIG. 10 is a block diagram illustrating opcode fetch decode, single step trap and stack pointer trap logic.
Figure 11:
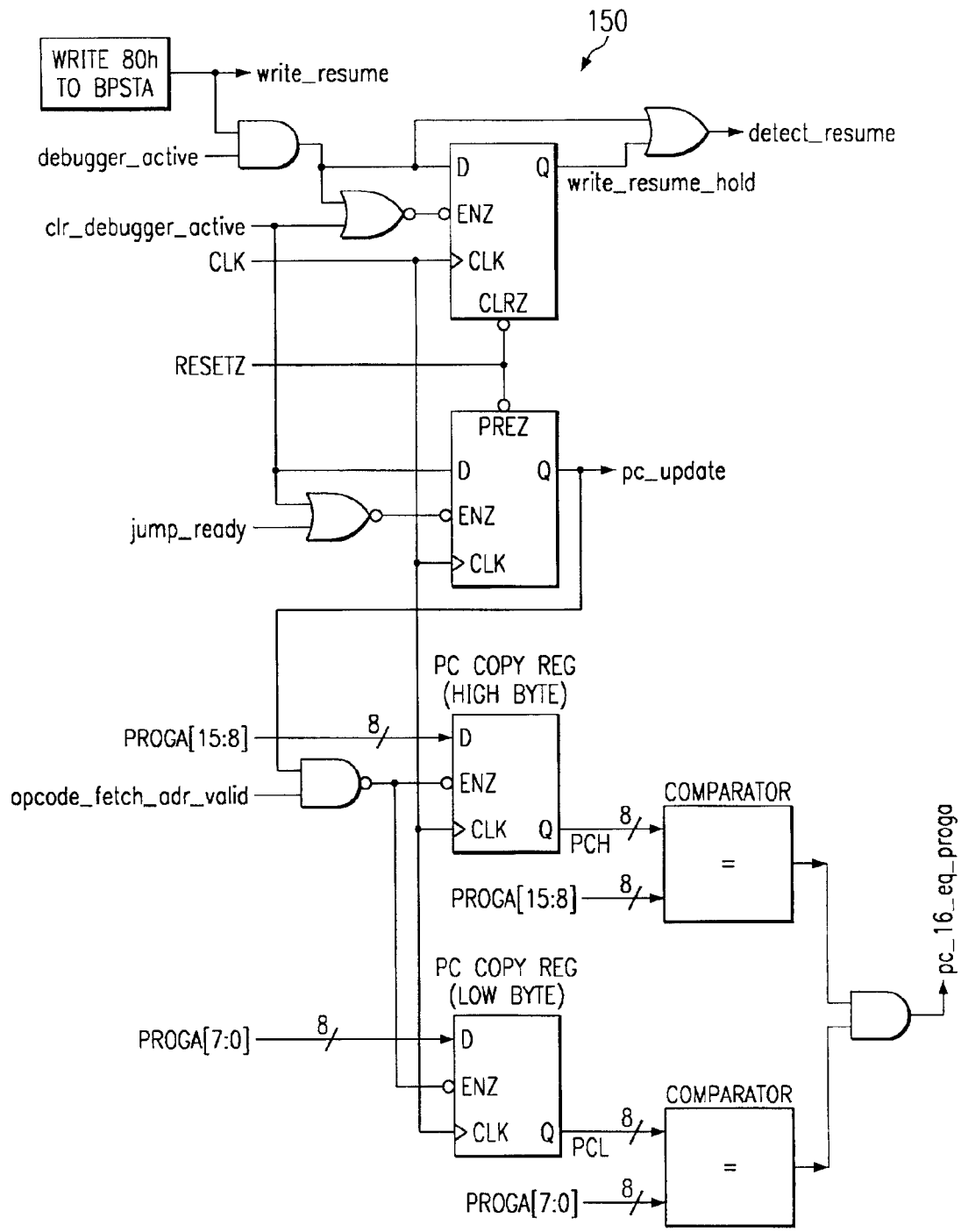
FIG. 11 is a block diagram illustrating program counter copy register and resume application program logic.

FIG. 10 is a block diagram illustrating opcode fetch decode, single step trap and stack pointer trap logic 140. This diagram shows the generation of opcode_fetch_adr_valid, opcode_fetch, single_step_trap, stack_trap, stack_trap_d2 and stack_trap_d3 signals. The multiple stack trap signals are used for different functions. For example, stack_trap_d2 is used to disable address breakpoints in FIG. 6, and stack_trap_d3 is used to generate the jump_ready signal in FIG. 6. FIG. 11 is a block diagram illustrating program counter copy register and resume application program logic 150. This diagram shows the generation of detect_resume, pc_update and pc_16_eq_proga signals. The pc_update signal is used to store the program counter contents into the program counter copy register. The detect_resume and pc_16_eq_proga signals are used to initiate the clear debugger state in FIG. 4.

FIG. 12 is a table illustrating special function register map 160. Stack pointer register 162 is located at address 81h. The special breakpoint registers 164 are located at addresses BDh to CFh. Program counter copy registers 166 are located at address F9h–FAh. Definitions for these registers are illustrated in FIGS. 13–18, which describe the function, bits, and reset values for each parameter or variable in the registers.

FIG. 13 is a set of tables illustrating an example breakpoint address and bank register definition. Only one set is shown, although preferably there are four sets of address breakpoints. Registers 170 and 172 hold the breakpoint address low byte and high byte, respectively. The address value from these registers is compared to the program counter when fetching an instruction. Register 174 contains the bank address and enable bits for the first breakpoint. When a match is detected, a long jump instruction followed by the address stored in the JTML/JTMH registers (shown in FIG. 14) will be inserted by the hardware.

FIG. 14 is a set of tables illustrating monitor entry address register definitions. Registers 180 and 182 contains the low byte and high byte for the monitor program jump address. These registers allow the jump to the monitor program from the application using only a long jump instruction and without using the stack.

FIG. 15 is a table illustrating the definition for stack breakpoint register 190. When special function register 81*h* (stack pointer) is detected, the content of the stack pointer is compared to stack breakpoint register 190 for determining a stack trap breakpoint. When a match is detected and the jump logic is triggered, updates to the program counter copy registers are disabled so that these registers will reflect the breakpoint program counter address.

FIG. 16 is a table illustrating the definition of breakpoint control register 200. Bits 0:3 contain the four address breakpoint enables 202. Bits 4:5 determine the stack pointer comparison function 204, such as disable, equal, greater than or less than. Bit 6 indicates single step enable 206. Bit 7 is the global debugger enable 208.

FIG. 17 is a table illustrating breakpoint status register definition. Note that on power up, extended special function registers BEh-CFh are write-protected. Writing a value of 55 h to this register will unprotect the extended special function registers. Bits 0:3 contain the address breakpoint status 210, indicating whether one of the four address breakpoints caused a breakpoint. Bit 4 is the stack trap status bit 212, indicating that the stack trap caused a break condition. Bit 5 is the single step status bit 214, indicating that a break condition was caused by the single step trap. Bit 6 reflects the real value of the EA bit 216 when in debug mode, and bit 7 is the resume control bit 218. EA bit 216 is the real value of EA bit of Interrupt Enable register 0 in the 8051 microcontroller. When the monitor program is executing, the debugger circuit disables the 8051 EA bit function to disable all interrupts.

FIG. 18 is a set of tables illustrating program counter copy register definitions. Registers 220 and 222 contain the low byte and high byte of the program counter to be used to resume the application program. When a breakpoint is detected, the value of the program counter is latched in these registers, reflecting the address that the monitor program should use to resume the application. These registers allow the return from the monitor program to the application using only a long jump instruction and without using the stack.

The attached Appendix provides a preferred embodiment hardware description language for the debugger configuration register set.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the details of the preferred embodiments, such as the multiplexer for substituting the monitor program address for the application breakpoint address, may be varied while remaining within the scope of the present invention. As another example, application program execution may be halted just before, during or just after the execution of a breakpoint address.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A microcontroller integrated circuit (IC) comprising:
   a program memory for storing a program to be executed;
   a program counter coupled to the program memory for selecting address locations in said memory;
   a program counter copy register for storing a program memory address pointed to by said program counter as a return address from a debug monitor routine;
   instruction execution circuitry coupled to the program memory for executing instructions received from said memory;
   a breakpoint address register for storing a breakpoint address;
   address compare circuitry for comparing a value in said program counter to a value in said breakpoint address register, said compare circuitry providing a breakpoint signal upon detection of a valid breakpoint address comparison; and
   a multiplexer interposed between said program memory and said program execution circuitry, said multiplexer comprising circuitry for inserting a debug instruction into the instruction execution circuitry upon receipt of said breakpoint signal, wherein said debug instruction is substituted for an instruction in a program memory address pointed to by said program counter.

2. The microcontroller IC of claim 1, further comprising:
   a stack pointer register;
   a stack breakpoint register for storing a stack trap address;
   stack pointer compare circuitry for comparing a value in said stack pointer register to a value in said stack breakpoint register, said stack pointer compare circuitry providing a stack trap signal upon detection of a valid stack pointer address comparison; and
   wherein said multiplexer inserts said debug instruction into the instruction execution circuitry upon receipt of said stack trap signal.

3. The microcontroller IC of claim 2, wherein said valid stack pointer address comparison is selected from the group consisting of: said value in said stack pointer register being equal to said value in said stack breakpoint register, said value in said stack pointer register being greater than said value in said stack breakpoint register, said value in said stack pointer register being less than said value in said stack breakpoint register, and combinations thereof.

4. The microcontroller IC of claim 1, further comprising single step circuitry directing said multiplexer circuitry to insert said debug instruction into the instruction execution circuitry after the execution of each instruction of an application program.

5. The microcontroller IC of claim 1, wherein said debug instruction is a long jump instruction to a debug monitor routine.

6. The microcontroller IC of claim 1, wherein said address comparison circuitry further comprises memory bank comparison circuitry for detecting a specific bank access in addition to said breakpoint address.

7. An embedded microcontroller apparatus comprising:
a circuit board embedded in the apparatus;
a microcontroller integrated circuit disposed on said circuit board, including
a program memory for storing a program to be executed,
a program counter coupled to the program memory for selecting address locations in said memory,
a program counter copy register for storing a program memory address pointed to by said program counter as a return address from a debug monitor routine, and
debug circuitry disposed on said microcontroller integrated circuit, said debug circuitry comprising
compare circuitry for comparing a breakpoint address to instruction fetch addresses in said program memory, said compare circuitry generating a breakpoint signal indicating a valid address compare; and
multiplexer circuitry coupled to said compare circuitry, said multiplexer circuitry, upon receiving said breakpoint signal, substituting a debug program instruction for execution by the microcontroller in place of a standard instruction fetched from program memory.

8. The embedded microcontroller apparatus of claim 7, wherein said apparatus is a universal serial bus controller.

9. The embedded microcontroller apparatus of claim 7, wherein said microcontroller further comprises a stack pointer register, and said debug circuitry further comprises:
a stack breakpoint register for storing a stack trap address; and
stack pointer compare circuitry for comparing a value in said stack pointer register to a value in said stack breakpoint register, said stack pointer compare circuitry providing a stack trap signal upon detection of a valid stack pointer address comparison; wherein said multiplexer substitutes said debug program instruction for execution by said microcontroller upon receiving said stack trap signal.

10. The embedded microcontroller apparatus of claim 9, wherein said valid stack pointer address comparison is selected from the group consisting of: said value in said stack pointer register being equal to said value in said stack breakpoint register, said value in said stack pointer register being greater than said value in said stack breakpoint register, said value in said stack pointer register being less than said value in said stack breakpoint register, and combinations thereof.

11. The embedded microcontroller apparatus of claim 7, said debug circuitry further comprising single step circuitry directing said multiplexer circuitry to substitute said debug program instruction for execution by said microcontroller after the execution of each standard instruction fetched from program memory.

12. The embedded microcontroller apparatus of claim 7, wherein said debug program instruction is a long jump instruction to a debug monitor routine.

13. A method of debugging a microcontroller integrated circuit, said method comprising:
storing a breakpoint address in a hardware register on said microcontroller integrated circuit;
executing an application program from program memory by said microcontroller;
comparing application program instruction addresses to said breakpoint address;
halting execution of said application program upon detection of an instruction fetch from a memory address equal to said breakpoint address;
storing said memory address in a program counter copy register, wherein said address is reloaded into said program counter after execution of said debug routine;
substituting a jump instruction to a debug program for said instruction fetched from said memory address; and
executing said debug program.

14. The method of claim 13, further comprising:
storing a stack trap address in a stack breakpoint hardware register on said microcontroller;
comparing stack pointer addresses to said stack breakpoint address; and
upon detection of a valid stack pointer address comparison, performing said halting execution, said substituting said jump instruction, and said executing said debug program steps.

15. The method of claim 14, wherein said valid stack pointer address comparison is selected from the group consisting of: said stack pointer address being equal to said stack breakpoint address, said stack pointer address being greater than said stack breakpoint address, said stack pointer address being less than said stack breakpoint address, and combinations thereof.

16. The method of claim 13, said executing said debug program comprising:
providing status information to external circuitry; and
receiving new breakpoint address information.

17. The method of claim 13, further comprising pushing the address stored in the program counter copy register onto a stack and executing a return to said application program at a location pointed to by said memory address.

* * * * *